Oct. 22, 1940.  C. W. HIRLEMAN  2,219,185
INCUBATOR
Filed Nov. 22, 1937  5 Sheets-Sheet 1
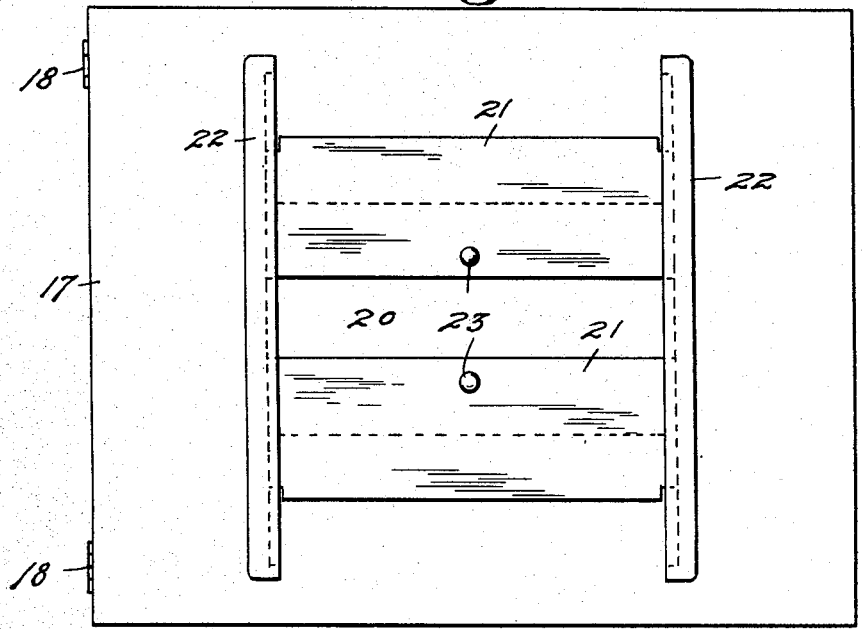
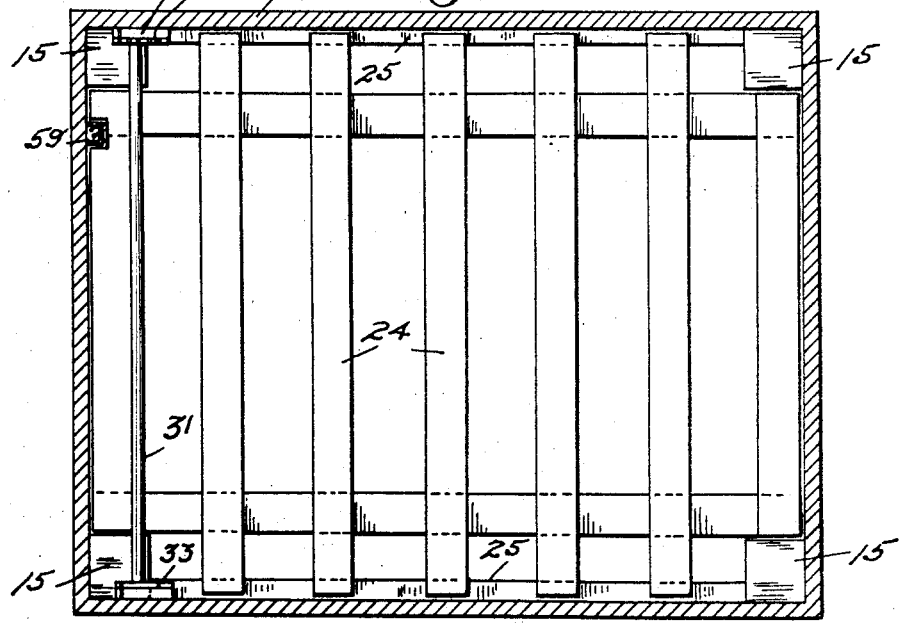
INVENTOR
Clark W. Hirleman
By his Attorneys
Kilgore & Kilgore

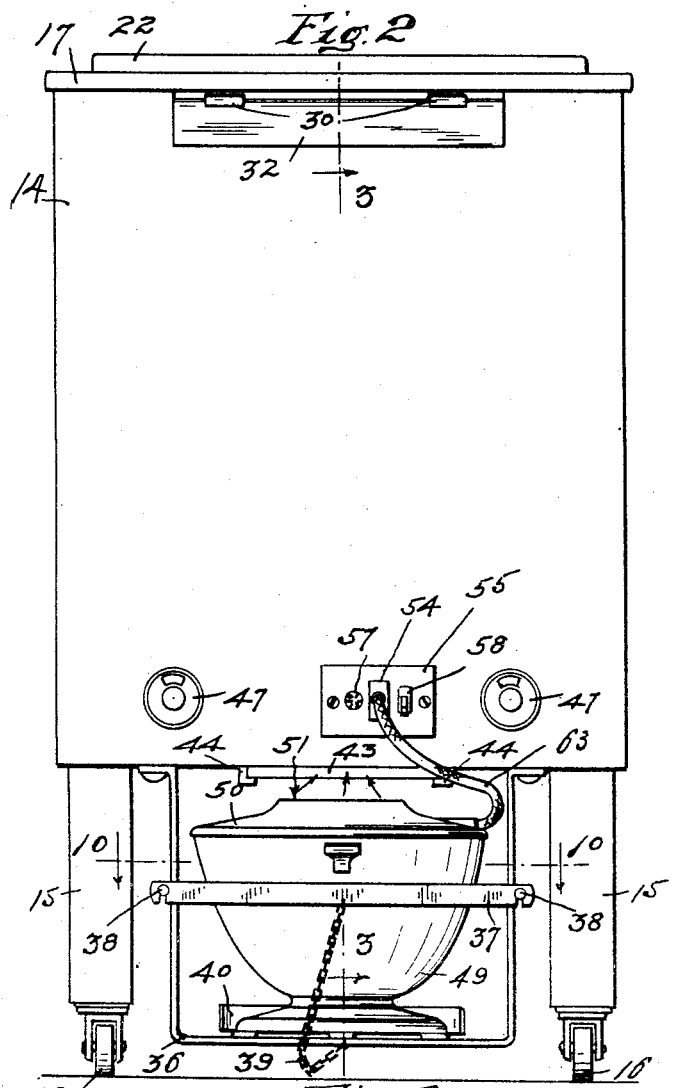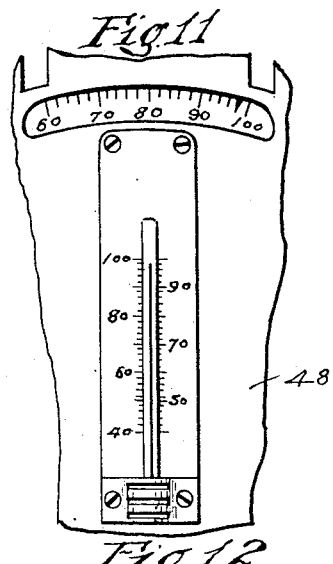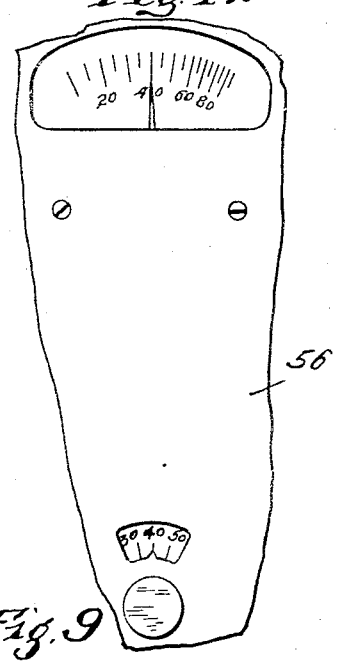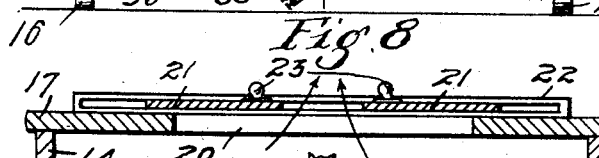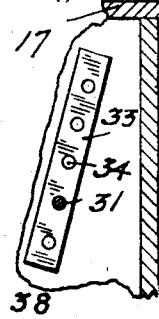

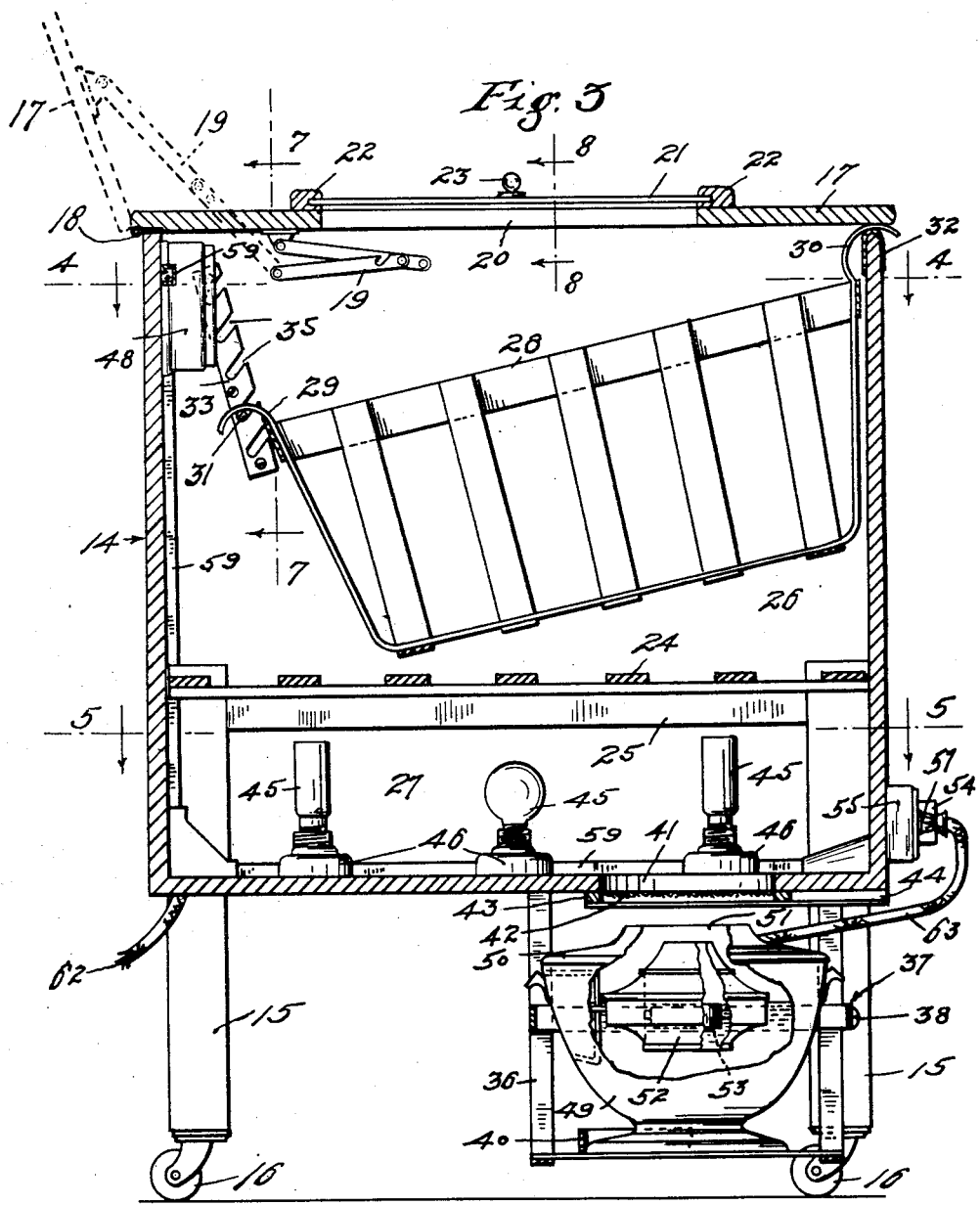
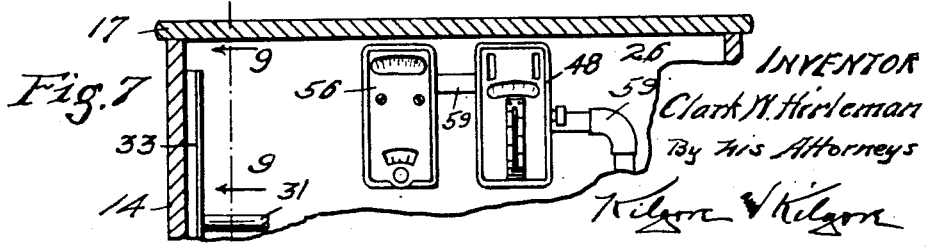

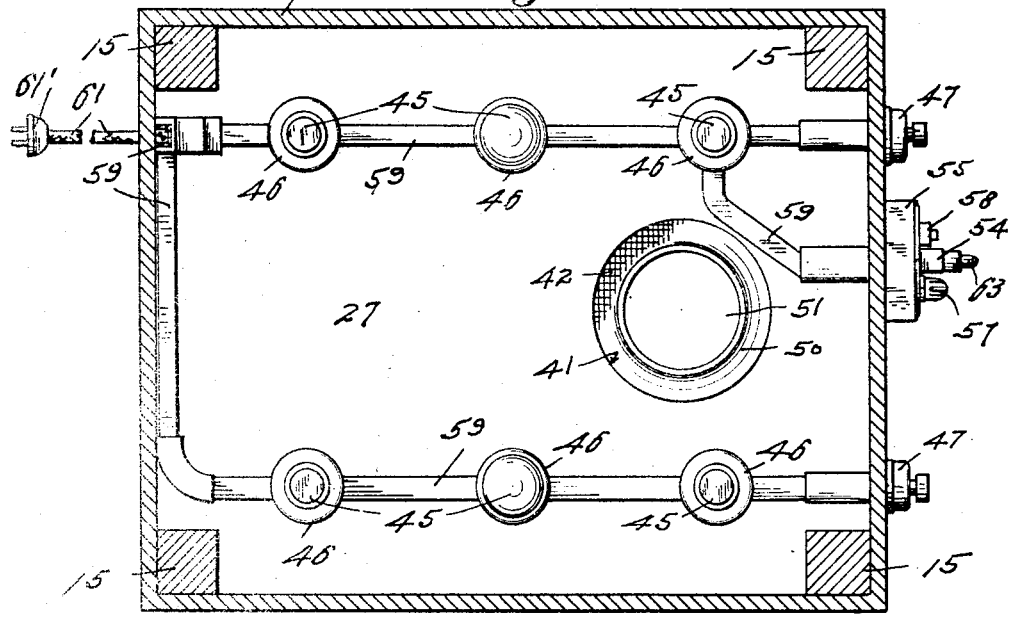
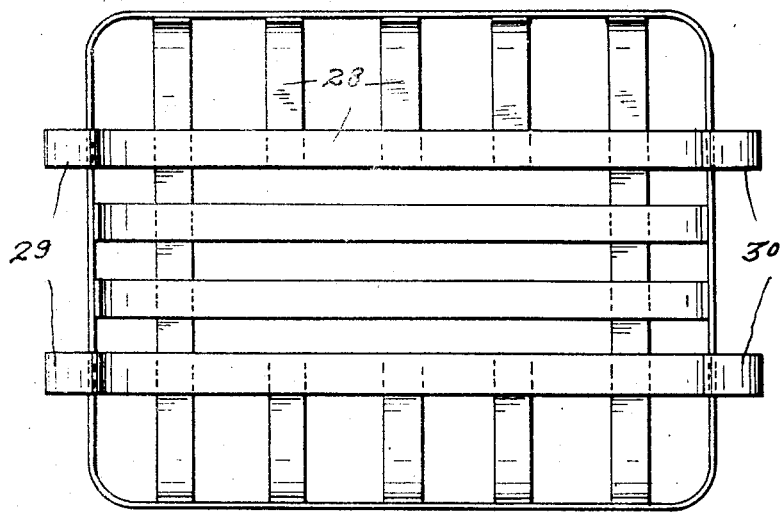

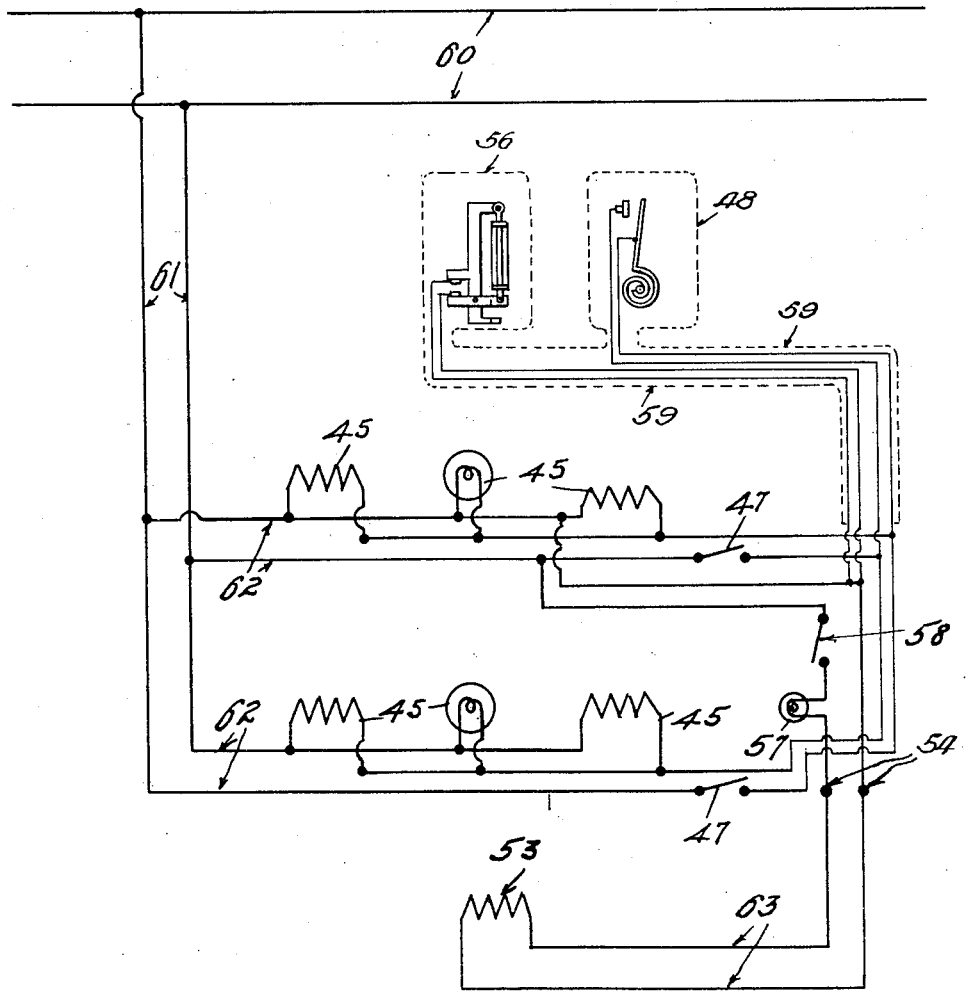

Patented Oct. 22, 1940

2,219,185

UNITED STATES PATENT OFFICE 2,219,185

INCUBATOR

Clark W. Hirleman, Minneapolis, Minn.

Application November 22, 1937, Serial No. 175,846

1 Claim. (Cl. 128—1)

My invention relates to incubators and, more particularly, to an incubator for babies and especially designed and well-adapted for use immediately after birth.

It is well known that a baby's circulating system does not begin to function properly for approximately forty-eight hours after birth, and this period is a critical time in the baby's life. During this period, the baby should be kept, as near as possible, under the same conditions as those just prior to birth.

The object of this invention is to produce these conditions, as near as possible, by providing an automatic heating system for keeping the temperature in the incubator substantially at the same temperature as that of the mother, which is approximately ninety-eight degrees (98°), to further provide automatic means for supplying the incubator with a predetermined, constant and uniform supply of humidity, as well as with fresh air, which is heated before entering the compartment in which the baby is kept, and to afford facilities for keeping the baby in a position in which the blood will flow to its head.

Other objects of the invention are to provide an incubator that can be manufactured and sold at a comparatively small cost, that is compact and of light weight, which facilitates moving or transporting the same from place to place, and that can be easily cleaned and sterilized.

By the use of this invention, it is possible, just prior to the birth of a baby, to heat the incubator containing the required amount of sterilized bedding, to the desired temperature and supply the same with the proper amount of humidity so that the baby, as soon after birth as possible, may be placed in the incubator, thus avoiding shocks resulting from a change in temperature or other conditions.

To the above end, generally stated, the invention consists of the novel devices, combinations of devices and arrangement of parts hereinafter described and defined in the claim.

In the accompanying drawings, which illustrate the invention, like characters indicate like parts throughout the several views.

Referring to the drawings:

Fig. 1 is a plan view of the improved incubator;

Fig. 2 is a front elevation of the same, with some parts broken away and sectioned;

Fig. 3 is a view principally in central vertical section, with some parts shown in different positions by means of broken lines;

Fig. 4 is a view, partly in plan and partly in section, taken substantially on the line 4—4 of Fig. 3, with some parts removed;

Fig. 5 is a view, partly in plan view and partly in section, taken on the line 5—5 of Fig. 3, with some parts removed;

Fig. 6 is a plan view of the bassinet removed from the incubator;

Fig. 7 is a fragmentary view, partly in elevation and partly in section, taken on the line 7—7 of Fig. 3;

Fig. 8 is a fragmentary detail view in section taken on the line 8—8 of Fig. 3;

Fig. 9 is a fragmentary detail view partly in elevation and partly in section taken on the line 9—9 of Fig. 7;

Fig. 10 is a fragmentary detail view with some parts sectioned on the line 10—10 of Fig. 2, with the humidifier removed;

Fig. 11 is a fragmentary elevation of the thermostat, on an enlarged scale;

Fig. 12 is a fragmentary elevation of the humidostat, on an enlarged scale; and

Fig. 13 is a wiring diagram.

The numeral 14 indicates a cabinet having supporting legs 15 equipped with castors 16. Said cabinet 14 is also provided with a displaceable main cover 17 hinged to the head end of the cabinet 14, as indicated at 18, for raising and lowering movements. When the main cover 17 is closed, it loosely rests on the upper edge portion of the cabinet 14. A jointed brace 19 is provided for holding the cover 17 in an open or raised position, as indicated by broken lines in Fig. 3.

The cover 17 is provided with a large central rectangular opening 20, through which the interior of the cabinet 14 may be viewed, and which also affords a ventilating or air escape passageway. This opening 20 may be completely closed and the air-conducting capacity varied, at will, by a pair of secondary covers 21. These covers 21 are slidably mounted, for movement toward or from each other, in a plane parallel to the cover 17, on a pair of grooved rails 22 secured to said cover, on the top thereof and at the head and foot ends of the opening 20. Each secondary cover 21 is provided with a knob 23 by which it may be moved on the rails 22.

Removably mounted in the cabinet 14 is a horizontally disposed grill or rack 24, which loosely rests on a pair of rails 25 secured to the sides of said cabinet. This rack 24, as shown, is made up of a plurality of transverse slats connected by a pair of longitudinal members, and divides the cabinet 14 into an upper or bassinet compartment 26 and a lower or heating compartment 27, the former of which is relatively deep and the latter of which is relatively shallow.

A bassinet 28 is removably suspended in the compartment 26 and, as shown, is a skeleton-like basket made up of a plurality of thin edgewise spaced metal strips. Two of the longitudinal members of the bassinet 28 have their ends shaped to form, at the head end of said bassinet, a pair of hook-like supporting fingers 29, and at the foot end thereof is a like pair of supporting fingers 30, and which pairs of fingers extend above the bassinet 28.

The supporting fingers 29 loosely rest on a horizontal transverse rod 31, and the fingers 30 loosely rest on a yoke-like wearing member 32, which straddles the upper edge portion of the foot end of the cabinet 14 and is secured thereto. This wearing member 32 extends substantially the full width of the cabinet 14 and is spaced from the cover 17 to leave clearance for the fingers 30. The fingers 30 hingedly support the bassinet 28 at its foot end and permit raising or lowering of the head end of said bassinet.

The rod 31 is removably supported at different elevations by a pair of inclined bar-like members 33 secured to the sides of the cabinet 14 on the inner faces thereof. One member 33, to wit: the one on the left-hand side of the cabinet 14, has a plurality of vertically spaced bore-like seats 34, into any one of which the respective end of the rod 31 may be inserted by an endwise movement, see Fig. 9. The other member 33 has a plurality of ratchet-like open seats 35, into any one of which the respective end of the rod 31 may be inserted by a lateral movement. Obviously, by mounting the rod 31 in the different pairs of seats 34 and 35, the head end of the bassinet 28 may be supported at different elevations relative to the foot end thereof.

It may be here stated that the bassinet 28 will be provided with a mattress and the necessary bedding, not shown.

Suspended from the bottom of the cabinet 14, at the foot end thereof, is a cage 36, for removably holding a humidifier, as will presently appear. This cage 36 includes a removable horizontal bar 37 having notched ends which releasably interlock with headed studs 38 on said cage. A chain 39 connects the bar 37 to the cage 36 to prevent the same from becoming lost. On the bottom of the cage 36 is a segmental centering flange 40. Formed in the bottom of the cabinet 14 at the center of the cage 36 is an air and moisture intake opening 41, covered by an air filter 42, of cheese-cloth or other suitable material. The filter 42 is secured to a frame 43 slidably mounted on guide rails 44 secured to the under side of the cabinet 14.

To keep the bassinet compartment 26 at a predetermined temperature, I provide an electric heating system which includes two series of heating elements 45. There is one of these series at each side of the heating compartment 27 and the respective elements 45 are spaced longitudinally thereof and removably mounted in a socket 46 secured to the bottom of said compartment.

Each series of heating elements 45 is independently controlled by a hand switch 47 on the exterior of the cabinet 14 at the foot end thereof where the same may be easily manipulated. As shown, there are three heating elements 45 in each series and the center one is an electric bulb for illuminating the interior of the cabinet. The heating system also includes a thermostat 48 secured to the head end of the cabinet 14 in the bassinet compartment 26 near the top thereof.

The invention also includes a humidifying system for supplying the bassinet compartment 26 with the proper amount of moisture, and includes a water receptacle 49 having a removable cover 50, in the center of which is a vapor escape opening 51. This humidifier is removably mounted in the cage 36 and centered by the flange 40 with its opening 51 directly under the air intake opening 41. The displaceable bar 37 prevents the humidifier from sliding out of the cage 36 in case the cabinet 14 is tipped during the moving thereof.

Within the water receptacle 49 is a float 52 in which is mounted a heating element 53, shown in the wiring diagram. The circuit for the heating element 53 includes a plug 54 detachably secured to a socket in a receptacle 55 on the foot end of the cabinet 14 between the two switches 47. The humidifying system also includes a humidostat 56 in the bassinet adjacent to the thermostat 48. In the circuit for the heating element 53 is a pilot lamp 57 and a hand switch 58, both of which are on the face of the receptacle 55, with the plug 54 therebetween. The wires within the cabinet 14 for the heating and humidifying systems are carried in conduits 59.

Referring now to the wiring diagram, the numeral 60 indicates the wires of a light line that is 110 volt A. C. or D. C., and the numeral 61 indicates a pair of circuit wires that can be attached by a plug 61' to any outlet in said light line. Branch circuit wires 62 for each series of heating elements 45 lead from the circuit wires 61 and one of the hand switches 47 is interposed in each pair of branch wires 62.

The circuit wires 63, for the heating element 53, of the humidifying system, and also the pilot light 57 lead from one pair of the branch circuit wires 62. The hand switch 58 is interposed in the circuit wires 63.

From the above description, it is evident that by opening the secondary covers 21, a baby in the bassinet may be watched and even moved and the bed arranged without opening the main cover 17. The thermostat 48 and the humidostat 56 may be inspected to see that they are properly set and adjusted. By adjusting the rod 31, the elevation of the head end of the bassinet 28 may be changed, at will, under the instruction of the attending physician or nurse. The filter 42 excludes all dust, lint or the like from the air entering the cabinet 14 through the intake opening 41. By manipulating the hand switches 47, one or both series of heating elements may be turned on or out of action. Likewise, the heating element 53 for the humidifier may be turned off or on by manipulating the switch 58 without affecting the supply of current to the heating element 45.

It may be here stated that the thermostat 48 will automatically keep the temperature in the bassinet compartment 26 at whatever temperature said thermostat is set for, by turning off or on the heating elements 45. Likewise, the humidostat 56 will automatically control the vaporization of the water in the receptacle 55 by turning on or off the heating element 53, so that the mount of humidity at which the humidostat is set will be supplied to the bassinet compartment 26.

When cleansing and sterilizing the incubator, the bassinet 28 and rack 24 may be quickly and easily lifted from the cabinet 14 when the main cover 17 is open. The humidifier may also be easily removed from the cage 36 for the purpose of emptying the water therein or refilling the same simply by removing the bar 37. The rack 24 also serves as a guard to prevent the baby's clothing or the bedding from coming in contact with the heating elements 45, thus preventing fire.

As previously stated, the improved incubator is very compact and of light weight and can easily be moved from place to place. Said incubator can be easily transported in an automobile when attending a birth where there are no hospital facilities.

From what has been said, it will be understood that the incubator described is capable of modification as to details of construction and arrangement within the scope of the invention herein disclosed and claimed.

What I claim is:

The combination with an incubator cabinet having legs supporting the same in an elevated position, said cabinet having an air intake opening in the bottom thereof, of a carrier suspended on the bottom of the cabinet surrounding the opening, a self-contained portable electrically heated humidifier removably supported by the bottom of the carrier and having a discharge opening in its upper end, and means carried by the carrier for centering the discharge opening in the humidifier directly below the center of the opening in the bottom of the cabinet.

CLARK W. HIRLEMAN.